US012632228B2

(12) United States Patent　(10) Patent No.: US 12,632,228 B2
Grover et al.　(45) Date of Patent: May 19, 2026

(54) GENERATION OF VECTORS FROM SOURCE CODE PRODUCED BY ARTIFICIAL INTELLIGENCE (AI) ALGORITHMS TO IDENTIFY ISSUES IN SOURCE CODE

(71) Applicant: MICRO FOCUS LLC, Wilmington, DE (US)

(72) Inventors: Douglas Max Grover, Rigby, ID (US); Michael F. Angelo, Houston, TX (US)

(73) Assignee: Micro Focus LLC, Wilmington, DE (US)

( * ) Notice: Subject to any disclaimer, the term of this patent is extended or adjusted under 35 U.S.C. 154(b) by 216 days.

(21) Appl. No.: 18/414,518

(22) Filed: Jan. 17, 2024

(65) Prior Publication Data

US 2025/0231744 A1　Jul. 17, 2025

(51) Int. Cl.
*G06F 8/35*　(2018.01)
*G06F 8/36*　(2018.01)
(52) U.S. Cl.
CPC . *G06F 8/35* (2013.01); *G06F 8/36* (2013.01)
(58) Field of Classification Search
None
See application file for complete search history.

(56) References Cited

U.S. PATENT DOCUMENTS

| | | | |
|---|---|---|---|
| 11,604,628 B2 * | 3/2023 | Ni | G06N 3/045 |
| 2024/0411882 A1 * | 12/2024 | Plate | G06F 21/566 |
| 2025/0045048 A1 * | 2/2025 | Dey | G06F 8/77 |
| 2025/0117195 A1 * | 4/2025 | Rieken | G06F 8/33 |
| 2025/0190576 A1 * | 6/2025 | Grover | G06F 21/577 |
| 2025/0231744 A1 * | 7/2025 | Grover | G06F 8/36 |

OTHER PUBLICATIONS

Ma, "DeepMutation: Mutation Testing of Deep Learning Systems", 2018, arXiv (Year: 2018).*
Suneja, "Towards Reliable AI for Source Code Understanding", 2021, ACM (Year: 2021).*
Liu, "Is Your Code Generated by ChatGPT Really Correct? Rigorous Evaluation of Large Language Models for Code Generation", 2023, 37th Conference on Neural Information Processing Systems (Year: 2023).*

* cited by examiner

*Primary Examiner* — Hossain M Morshed
(74) *Attorney, Agent, or Firm* — Sheridan Ross P.C.

(57)　ABSTRACT

A mutated issue in AI generated source code is identified. For example, the mutated issue may be a mutated type of malware. A snippet of source code in the AI generated source code that comprises the mutated issue is identified. A vector based on the snippet of source code in the AI generated source code that comprises the mutated issue is generated. Vectors of a second source code (e.g., a new software application) are compared using the vector generated from the snippet of source code in the AI generated source code that comprises the mutated issue. The comparison is used to identify new types of issues in the second source code.

27 Claims, 10 Drawing Sheets

GENERATION OF VECTORS FROM SOURCE CODE PRODUCED BY ARTIFICIAL INTELLIGENCE (AI) ALGORITHMS TO IDENTIFY ISSUES IN SOURCE CODE

FIELD

The disclosure relates generally to detecting issues (e.g., malware, vulnerabilities, non-optimal source code, etc.) in source code and particularly to detecting mutated issues in source code generated Artificial Intelligence (AI) algorithms.

BACKGROUND

One of the problems with AI algorithms is that they can generate source code that contains new malware/vulnerabilities/non-optimal source code. This may include wherein the training source code may not contain any malware/vulnerabilities/non-optimized source code. In other instances, the AI algorithm may be intentionally used by hackers to create new mutated versions of malware/vulnerabilities, which may make the new malware/vulnerabilities more difficult to detect. Failure to detect the new malware/vulnerabilities may result in attacks on the source code, attacks on computer networks, loss of sensitive information, and/or the like.

SUMMARY

These and other needs are addressed by the various embodiments and configurations of the present disclosure. The present disclosure can provide a number of advantages depending on the particular configuration. These and other advantages will be apparent from the disclosure contained herein.

A mutated issue in AI generated source code is identified. For example, the mutated issue may be a mutated type of malware. A snippet of source code in the AI generated source code that comprises the mutated issue is identified. A vector based on the snippet of source code in the AI generated source code that comprises the mutated issue is generated. Vectors of a second source code (e.g., a new software application) are compared using the vector generated from the snippet of source code in the AI generated source code that comprises the mutated issue. The comparison is used to identify new types of issues in the second source code.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112. Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

As described herein and in the claims, the term "issue" may be any type of issue in source code, such as a vulnerability, malware, viruses, a defect, non-optimal source code, a bug, and/or the like.

As described herein and in the claims, a mutated issue is an issue that has been mutated from its original version by an AI algorithm.

When discussing a snippet of source code in the AI generated source code that comprises a mutated issue herein and, in the claims, the snippet of source code in the AI generated source code that comprises the mutated issue may comprise only a portion of the mutated issue. For example, if the mutated issue is a new version of malware that is two thousand lines of source code, the snippet may be only a portion of the two thousand lines of source code (e.g., one thousand lines of source code).

As described herein and in the claims, the terms machine learning algorithm and AI algorithm may be used interchangeably.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
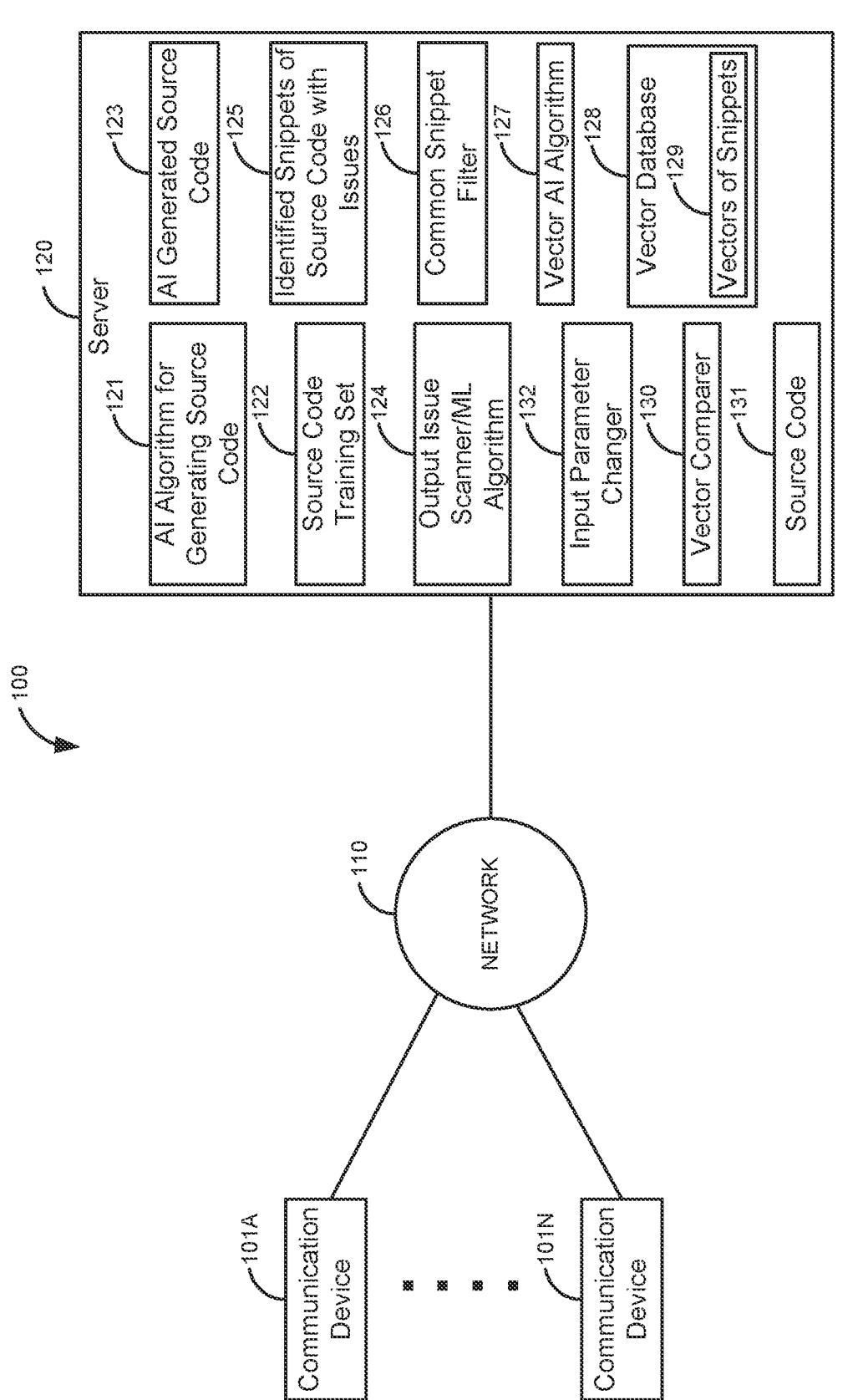
FIG. 1 is a block diagram of a first illustrative system for generating vectors from AI generated source code produced by Artificial Intelligence (AI) algorithms to identify issues in source code.

FIG. 1 is a block diagram of a first illustrative system 100 for generating vectors from AI generated source code 123 produced by Artificial Intelligence (AI) algorithms to identify issues in source code 131. The first illustrated system 100 comprises communication devices 101A-101N, a network 110, and a server 120.

The communication devices 101A-101N can be or may include any user device that can communicate on the network 110, such as a Personal Computer (PC), a cellular telephone, a Personal Digital Assistant (PDA), a tablet device, a notebook device, a laptop computer, a smartphone, and/or the like. As shown in FIG. 1, any number of communication devices 101A-101N may be connected to the network 110, including only a single communication device 101. The communication devices 101A-101N are used by users to access the server 120.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and/or the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server 120 may be any device that can provide services for the communication devices 101A-101N. For example, the server 120 may be an application server, a web server, a cloud service, another communication device 101, and/or the like. The server 120 comprises an AI algorithm for generating source code 121, a source code training set 122, AI generated source code 123, an output issue scanner/Machine Learning (ML) algorithm 124, identified snippets of source code with issues 125, a common snippet filter 126, a vector AI algorithm 127, a vector database 128, vectors of snippets 129, a vector comparer 130, and source code 131.

The AI algorithm for generating source code 121 may be any AI algorithm that can be used to generate source code, such as OpenAI Codex, Tabnine, Code5T, Polycoder, GitHub Copilot, Seek, and/or the like. The AI algorithm for generating source code 121 typically takes user input to generate the AI generated source code 123 based on the source code training set 122. The AI algorithm for generating source code 121 may get input from the output issue scanner/ML algorithm 124 and/or from other sources.

The source code training set 122 may comprise different types of source code in different programming languages. For example, the source code training set 122 may be in the Java programming language, in the Pearl programming language, in the C++ programming language, and/or the like. The source code training set 122 may comprise binary source code, machine language source code, and/or the like. The source code training set 122 may comprise specific types of source code, such as malicious source code, vulnerable source code, non-optimal source code, and combination of these, and/or the like.

The AI generated source code 123 may be any type of source code generated by the AI algorithm for generating source code 121. The AI generated source code 123 may be different based on different input (e.g., user input) or even the same input. The AI generated source code 123 may be in any programming language, such as, Java, JavaScript, C, C++, C##, Pearl, Python, binary, and/or the like.

The output issue scanner/ML algorithm 124 may be any type of system that can scan for issues in the AI generated source 123 (or any source code for that matter). The output issue scanner 124 may have a ML algorithm/AI algorithm that is trained to identify issues/mutations of issues. The output issue scanner/ML algorithm 124 can be used to modify the input parameters via the input parameter changer 132.

The identified snippets of source code with issues 125 are snippets of the AI generated source code 123 that have issues that were identified by the output issue scanner/ML algorithm 124. The identified snippets of the source code with issues 125 may be snippets of malware, snippets of vulnerabilities, snippets of non-optimal code, snippets of bugs, and/or the like. An individual snippet of the source code with an issue 125 may comprise single snippet or may comprise multiple snippets.

The common snippet filter 126 is used to filter out snippets that are the same as previously identified snippets. In one embodiment, the common snippet filter 126 may also be used to filter out common vectors instead of common snippets.

The vector AI algorithm 127 is an AI algorithm that converts the identified snippets of source code with issues 125 to vectors (e.g., floating point vectors or integer vectors). The vectors are then compared to vectors that are generated from snippets of the source code 131 to identify identical or similar snippets. For example, identical snippets will have the same vectors. On the other hand, if the vectors are not identical, but close in value, the snippets are identified as being similar. Similar vectors refer to the vectors being close in vector-space. The vector AI algorithm 127 may be used to determine the distance between vectors, such as Euclidian distance, or Cosine similarity. In this case where vectors are determined to be similar, a threshold may be used. In one embodiment, instead of comparing vectors, snippets may be directly compared. Alternatively, hashes of the snippets may be compared.

The vector database 128 is a database of vectors generated from snippets of the source code with issues 125 that have been identified by the output issue scanner/ML algorithm 124. The vectors of snippets 129 are compared with vectors generated from snippets of the source code 131.

The vector comparer 130 is used to compare the vectors of snippets 129 in the vector database 128 to vectors generated from snippets of the source code 131. The vector comparer 130 may use different size snippets to generate the vectors of snippets 129 and corresponding sized vectors generated from the source code 131.

The source code 131 may be any source code 131 that is scanned by the output issue scanner/ML algorithm 124. For example, the source code 131 may be a new software and/or firmware application that is being evaluated for issues. The source code 131 may be any type of source code 131 in any programming language, such as, Java, C, C++, Pearl, Python, binary, and/or the like.

The input parameter changer 132 may be any process/algorithm that can be controlled to change the input to the AI algorithm for generating source code 121. The input changer may be controlled by the output issue scanner/ML algorithm 124 based on identified issues in the AI generated source code 123. For example, the input parameter changer 132 may receive input from the output issue scanner/ML algorithm 124 to modify the source code to produce a mutated malware that is based on an identified type of malware identified by the output issue scanner/ML algorithm.

While the elements 121-132 are all shown in the server 120. One or more of the elements 121-132 may reside on a communication device 101 or may be distributed among other devices on the network 110. For example, the vector database 128, the vector comparer 130/vectors of snippets 129 and the source code 131 may reside on a second server 120 that is part of a cloud service that is used to scan the source code 131.

Figure 2:
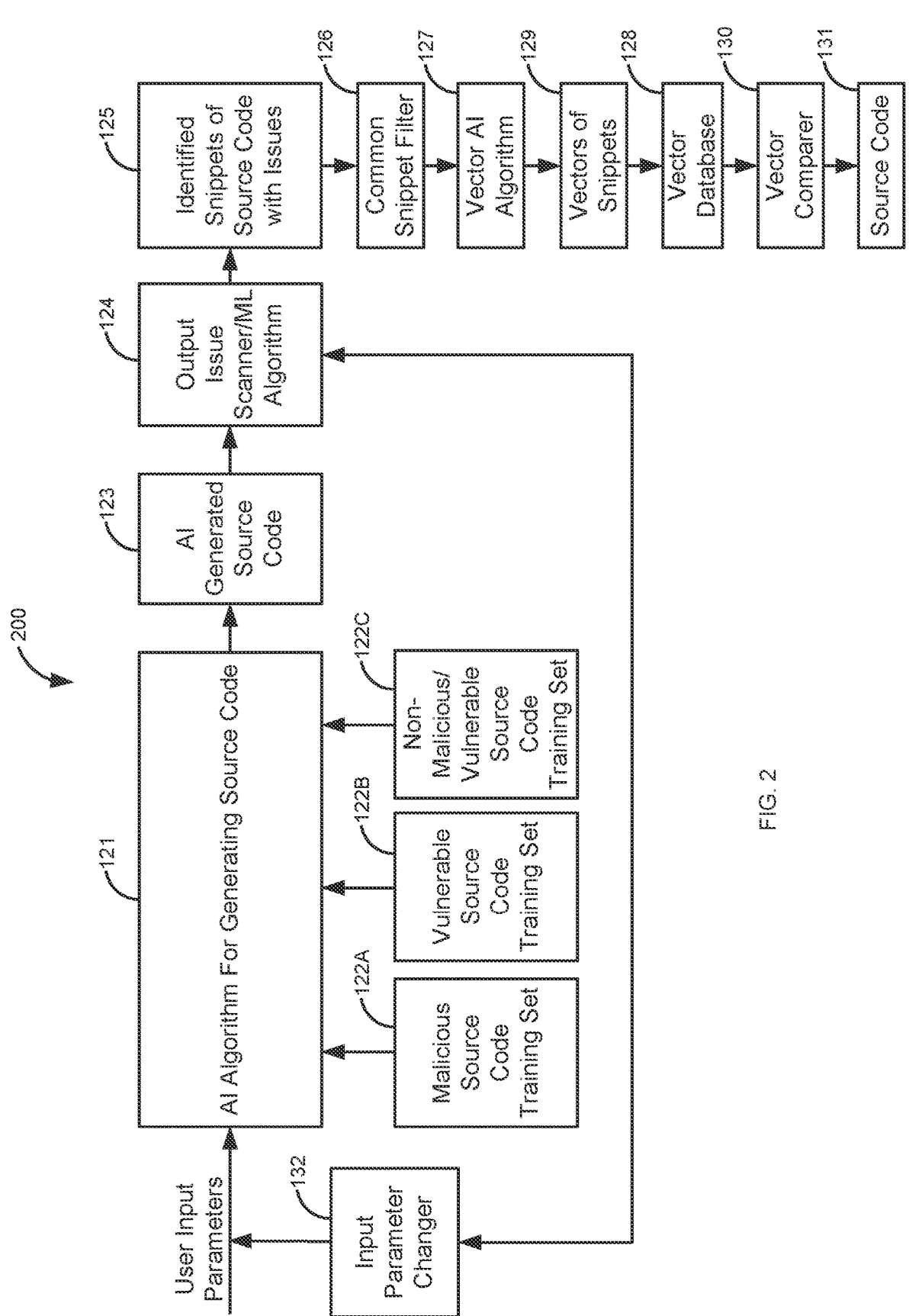
FIG. 2 is a block diagram of a second illustrative system for generating vectors from source code produced by AI algorithms to identify issues in the source code.

FIG. 2 is a block diagram of a second illustrative system 200 for generating vectors from source code 131 produced by AI algorithms to identify issues in the source code 131. FIG. 2 shows the flows of how the vectors of snippets 129 are generated for scanning the source code 131.

The process uses the AI algorithm for generating source code 121 to generate different mutations of issues. The mutations can be generated based on different training sets, combinations of training sets, and/or various kinds of input. For example, the AI algorithm for generating source code 121 may use a malicious source code training set 122A, a vulnerable source code training set 122B, a non-malicious/vulnerable source code training set 122C, and/or the like.

The process starts when user input parameters (or could be parameters from another AI algorithm or other process) are input into the AI algorithm for generating source code 121. As a result, the AI algorithm for generating the source code 121 generates the AI generated source code 123. The AI generated source code 123 is then scanned by the output issue scanner/ML algorithm 124 to identify any issues in the AI generated source code 123. The output issue scanner/ML algorithm 124 identifies the snippets of source code with issues 125. For example, if there is a type of malware that is one hundred lines of source code long, the output issue scanner/ML algorithm 124 may create snippet from the AI generated source code 123 that is the size of the identified malware (i.e., one hundred lines of source code).

The output issue scanner/ML algorithm 124 may look for all types of issues (e.g., malware, vulnerabilities, non-optimal source code, etc.) or look for specific types of issues. For example, the output issue scanner/ML algorithm 124 may only look for malware/viruses.

The identified snippet(s) are then sent to the common snippet filter 126 to make sure that the identified snippet(s) are new. If the snippet(s) are new, the vector AI algorithm 127 converts the snippet(s) into the vector(s) of snippet(s) 129 (e.g., floating-point vectors). The vectors of snippets 129 are the stored in the vector database 128.

The vectors are typically vector sets of the same size based on each of the types of issues. This is because the identified snippets may be different sizes based on the type of issue. For example, a snippet of a specific type of malware may average one hundred lines of source code while the snippet size for a buffer overflow vulnerability may have an average twenty lines of source code. Depending on the size of the identified issue, the snippet size may be smaller than that the source code of the issue. For example, if a complex type of malware comprises ten thousand lines of source code, the snippet size for the complex type of malware may be ten snippets that are each one thousand lines of source code.

The vector comparer 130 then uses the vectors of snippets 129 in the vector database 128 to identify issues in the source code 131. For example, the source code 131 is broken up into the same size snippets and then converted to vectors. The vector(s) of the source code 131 are compared to the vector(s) of snippets 129 to see if there is a match and/or if they are similar. If the snippet size is smaller (e.g., the example above where the snippet of malware was broken up into ten snippets), the threshold not only include a number match (e.g., a floating-point vector match), but also may include a number of snippet matches to be considered the same or similar.

In one embodiment, the output issue scanner/ML algorithm 124 may use the identified snippets (e.g., snippets of mutated issues) and send that information to the input parameter changer 132. The input parameter changer 132 can then use that information as new input parameter(s) to generate new AI generated source code 123/mutations. For example, the identified mutation may be feedback as input parameters with the condition that the AI algorithm for generating source code 121 mutates the identified mutated issue in order to produce a new variant of the mutated issue. The output issue scanner/ML algorithm 124 may also change the input parameters in various ways, such as, changing the text to request the AI algorithm for generating source code 121 to mutate a specific type of vulnerability/ malware (e.g., vulnerabilities/malware that are part of the source code training set 122). The process can be repeated for different types of issues to regenerate the AI generated source code 123 that can then be scanned again to identify new mutations of the issues.

Likewise, the input parameter changer 132 may dynamically change the input based on input from the output issue scanner/ML algorithm 124. The output issue scanner/ML algorithm 124 can track the input parameters that have been previously used along with the identified mutations that are produced. The output issue scanner/ML algorithm 124 can then identify different inputs that are likely produce new mutations versus the inputs that do not produce new mutations in order to better produce new inputs that create new mutations of the issues. The new inputs can then be input into the AI algorithm for generating source code 121 to produce new AI generated source code 123/new mutations.

In one embodiment, the ML algorithm in the output issue scanner/ML algorithm 124 may be a Generative Adversarial Network (GAN) AI algorithm that can be used to change the input of the AI algorithm for generating source code 121. The GAN AI algorithm uses the positively identified malware/vulnerabilities to change the input of AI algorithm for generating source code 121. Alternatively, the ML algorithm in the output issue scanner/ML algorithm 124 may be a neural network or some other type of AI algorithm.

Figure 3:
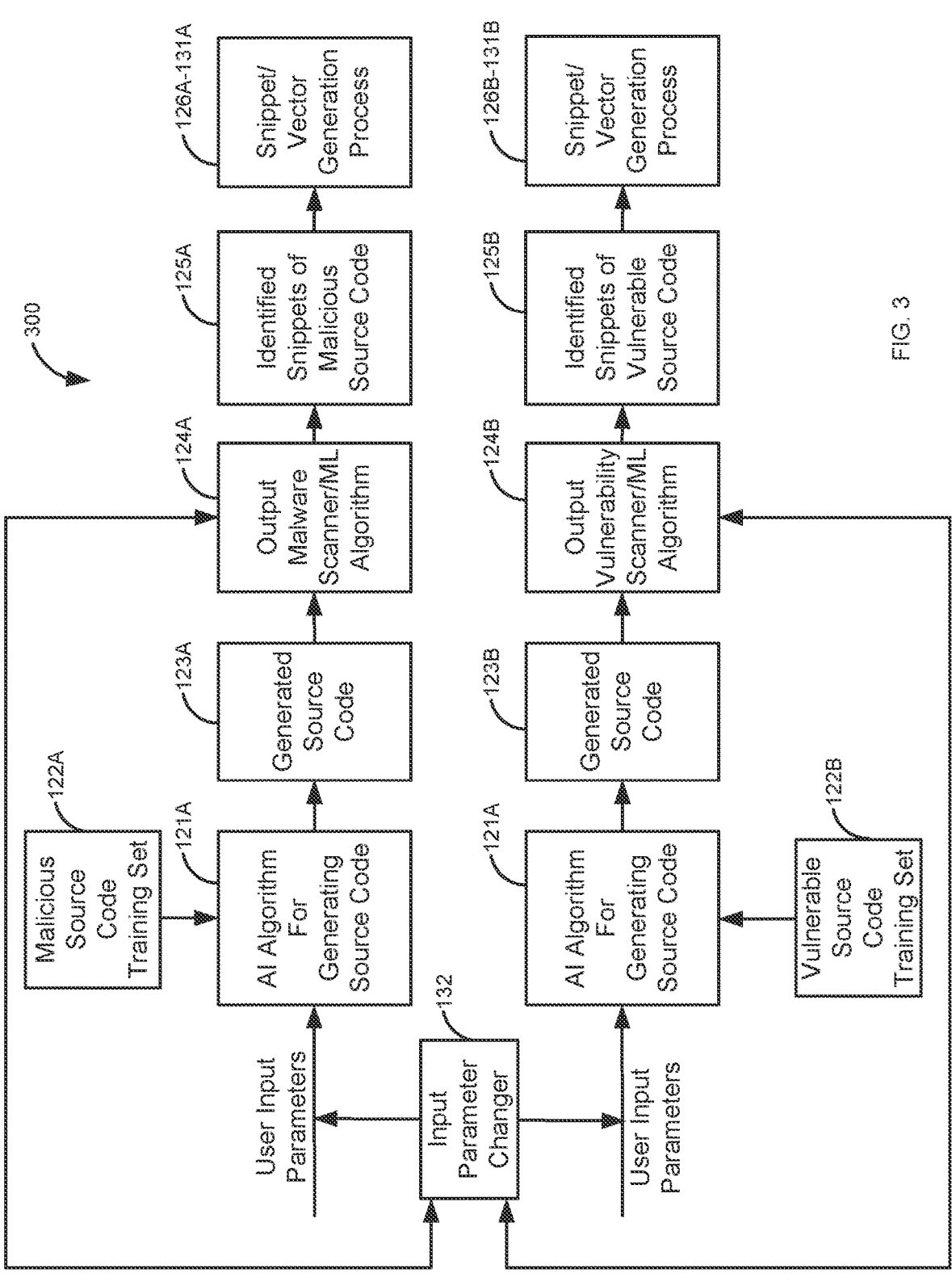
FIG. 3 is a block diagram of a third illustrative system for generating vectors from source code produced by AI algorithms where multiple AI algorithms are used.

FIG. 3 is a block diagram of a third illustrative system 300 for generating vectors from source code produced by AI algorithms where multiple AI algorithms are used. FIG. 3 is similar to FIG. 2. However, the primary difference is that there are two sets of the elements 121-131 where the AI algorithm for generating source code 121A/121B in each process is trained with a different source code training set 122A/122B. In FIG. 3 the elements 121A-131A comprise a first process for using a malicious source code training set 122A and a second process for using a vulnerable source code training set 122B. Thus, the generated vectors of snippets 129A/129B are used to by the vector comparer 130A-130N to scan for different types of issues. Because the types of issues are different, the snippet sizes may be different. Another difference is that may be a single input code changer 132 for both processes. In FIG. 3, each process could be a different service (e.g., separate types of cloud services).

Figure 4:
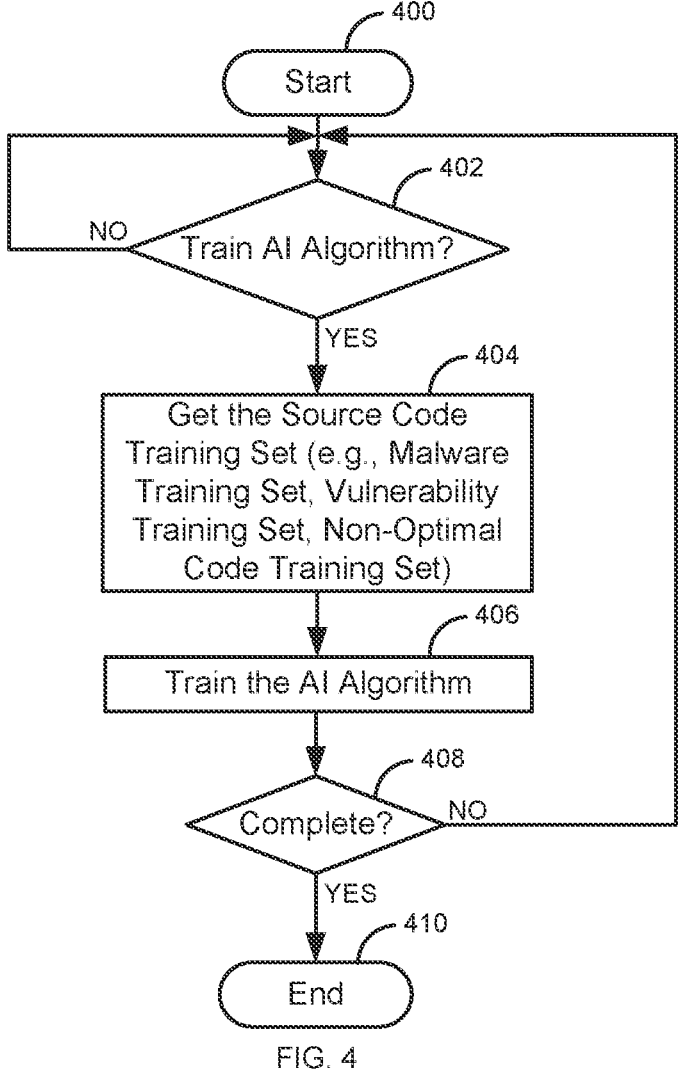
FIG. 4 is a flow diagram of a process for training an AI algorithm.

FIG. 4 is a flow diagram of a process for training an AI algorithm. Illustratively, the communication devices 101A-101N, the server 120, the AI algorithm for generating source code 121, the source code training set 122, the AI generated source code 123, the output issue scanner/ML algorithm 124, the identified snippets of source code with issues 125, the common snippet filter 126, the vector AI algorithm 127, the vector comparer 130, the vector database 128, the vectors of snippets 129, the vector comparer 130, the source code 131, and the input parameter changer 132 are stored-program-controlled entities, such as a computer or microprocessor, which performs the method of FIGS. 4-10 and the processes described herein by executing program instructions stored in a computer readable storage medium, such as a memory (i.e., a computer memory, a hard disk, and/or the like). Although the methods described in FIGS. 4-10 are shown in a specific order, one of skill in the art would recognize that the steps in FIGS. 4-10 may be implemented in different orders and/or be implemented in a multi-threaded environment. Moreover, various steps may be omitted or added based on implementation.

The process starts in step 400. The AI algorithm for generating source code 121 determines, in step 402, if an input has been received to train the AI algorithm for generating source code 121. If an input has not been received in step 402, the process of step 402 repeats.

Otherwise, if an input (input parameters) has been received in step 402, the AI algorithm for generating source code 121 gets the source code training set 122 in step 404. For example, the source code training set 122 may be the vulnerable source code training set 122B, the malicious source code training set 122A, the non-malicious/vulnerable source code training set 122C, a known non-optimal source code training set, and/or the like. The AI algorithm for generating source code 121 then is trained using the source code training set 122 in step 406.

The process determines, in step 408, if the process is complete. If the process is not complete, the process goes back to step 402. Otherwise, the process ends in step 410.

Figure 5:
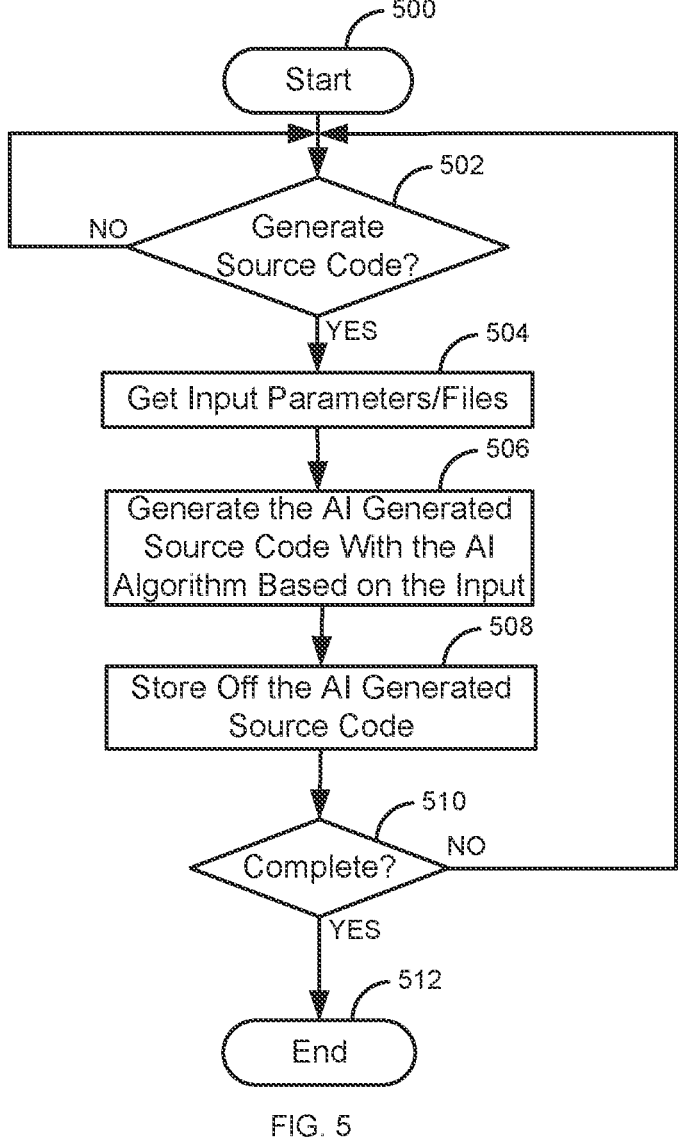
FIG. 5 is a flow diagram of a process generating AI generated source code.

FIG. 5 is a flow diagram of a process generating AI generated source code 123. The process starts in step 500. The AI algorithm for generating source code 121 determines, in step 502, if a request has been received to generate the AI generated source code 123. If a request has not been received in step 502, the process of step 502 repeats.

Otherwise, if a request has been received in step 502, the AI algorithm for generating source code 121 gets the input parameters/files in step 504. The input parameters may be text from a user, voice input from a user, one or more files (e.g., source code with known malware, source code with known vulnerabilities, known non-optimal source code, etc.) and/or the like. For example, the input parameters may be to generate an application that encrypts communications for a web application using 256-bit encryption that has a mutated version of a snippet of source code that disables the encryption using a backdoor access.

The AI algorithm for generating the source code 121 generates the AI generated source code 123 based on the input parameters/files in step 506. The AI generated source code 123 is stored off in step 508.

The process determines, in step 510, if the process is complete. If the process is not complete in step 510, the process goes back to step 502. Otherwise, the process ends in step 512.

Figure 6:
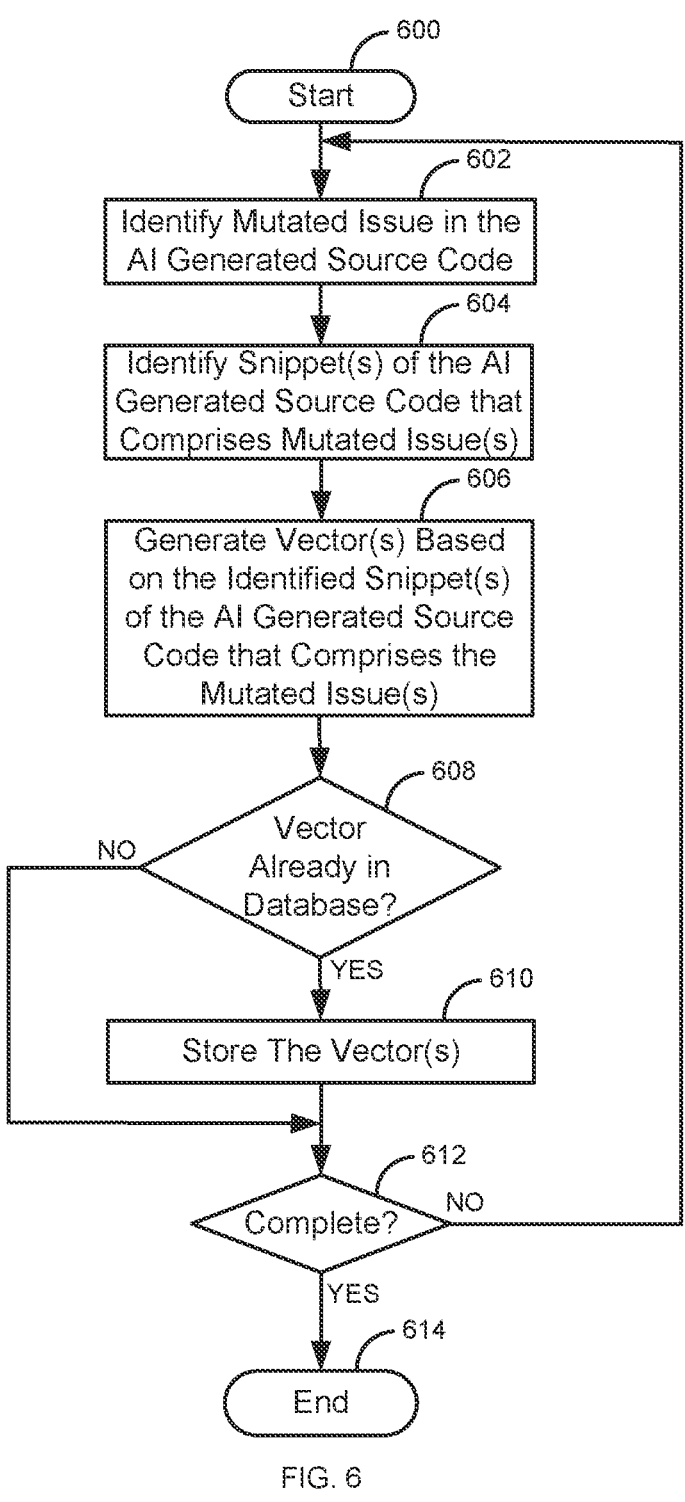
FIG. 6 is a flow diagram of a process for identifying mutated issues in AI generated source code.

FIG. 6 is a flow diagram of a process for identifying mutated issues in AI generated source code 123. The process starts in step 600. The output issue scanner/ML algorithm 124 identifies, in step 602, one or more mutated issues in the AI generated source code 123 (e.g., the AI generated source code 123 stored off in step 508). For example, the mutated issue may be a mutated type of malware, a mutated vulnerability, a mutated non-optimal type of source code, and/or the like. The output issue scanner/ML algorithm 124 identifies snippet(s) of the AI generated source code 123 that comprise the mutated issue(s) in step 604. For example, source code for the mutated type of malware may be identified in step 604.

The size of the snippets may vary depending on the issue/type of the mutation. For example, a size of a type of malware may have a larger snippet size than a size of a vulnerability or non-optimal source code.

The vector AI algorithm 127 generates vector(s) based on the identified snippets of the AI generated source code 123 that comprises the mutated issue(s) in step 606. For example, the AI algorithm may generate floating-point vectors using the identified type of malware. The common snippet filter 126 determines, in step 608, if the generated vector(s) (or could be snippet based where snippets are compared in step 608) are already in the vector database 128. If the vector(s) and/or snippet(s) are already in the vector database 128, the process goes to step 612. Otherwise, if the vector(s)/snippet(s) are not in the vector database 128, the vectors are stored in the vector database 128 in step 610.

In addition, the size of the snippet is stored off to be used later when comparing snippet sizes for vectors as described in FIGS. 7-10. For example, the stored off snippet size is used to break up the source code 131 into snippets to search for the same issue/type in the source code 131. This may also include where the source code 131 is broken up based on execution points. An execution point is a point in the source code 131 (e.g., a function call) where only a portion of the source code 131 is broken up to scan for a specific issue/type. The process then goes to step 612.

The process determines, in step 612, if the process is complete. If the process is not complete in step 612, the process goes back to step 602. Otherwise, the process ends in step 614.

Figure 7:
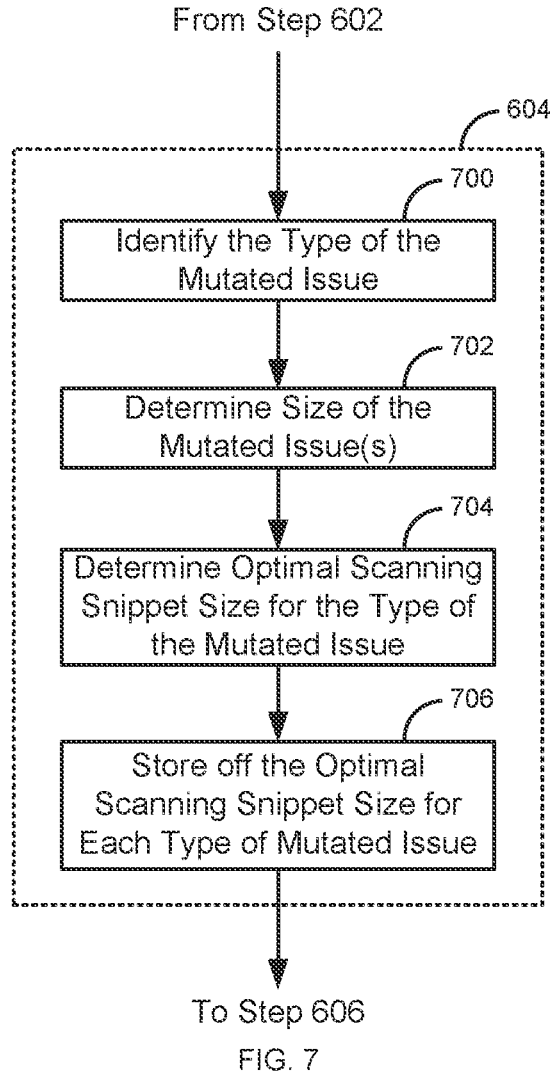
FIG. 7 is a flow diagram of a process for identifying types of mutated issues based on different snippet sizes.

FIG. 7 is a flow diagram of a process for identifying types of mutated issues based on different snippet sizes. FIG. 7 is an exemplary embodiment of step 604 of FIG. 6. After identifying the mutated issues in step 602, the output issue scanner/ML algorithm 124 identifies a type for each of the identified mutated issues in step 700.

The output issue scanner/ML algorithm 124 determines, in step 702, a size of the mutated issue. The size of the snippet(s) may be based on the type of issue. The size of the snippet(s) may vary based on the type of malware/vulnerability/non-optimal source code. For example, if the snippet size of a type of malware is one hundred lines of code, the snippet size may be one hundred lines of code for that type of malware. If the snippet size of a type of vulnerability is ten lines of code, the snippet size used to create vectors for that type of vulnerability may be ten lines of code. Thus, there may be multiple passes over the source code 131 using different snippet sizes for each type of issue and/or mutation. The snippet size may be based on various types of requirements. For example, the snippet size may be lines of code, bytes (for binaries), based on function size, and/or the like.

The output issue scanner/ML algorithm 124 determines an optimal snippet size for the type of mutated issue in step 704. In one embodiment, the output issue scanner/ML algorithm 124 may be used to learn optimal snippet sizes based on the type of issue. For example, for a first type of malware, the output issue scanner/ML algorithm 124 may learn that an optimal snippet size may be one hundred lines of code. For multiple mutations of the same type of malware, the size of the mutations may vary between eighty and one hundred and twenty lines. In this example, the optimal snippet size may be ninety-five lines of source code based on an average and/or mean, may be set to one hundred and ten lines of code based on a maximum size, based on each specific mutation size, and/or the like. For a second type of malware, the optimal snippet size may be two hundred lines of code. Similarly, for vulnerabilities, non-optimal code, bugs, and/or the like, the output issue scanner/ML algorithm 124 may determine different optimal snippet sizes and/or multiple snippet sizes. The optimal snippet sizes for each type of mutated issue is stored off in step 706 and the process goes to step 606.

Figure 8:
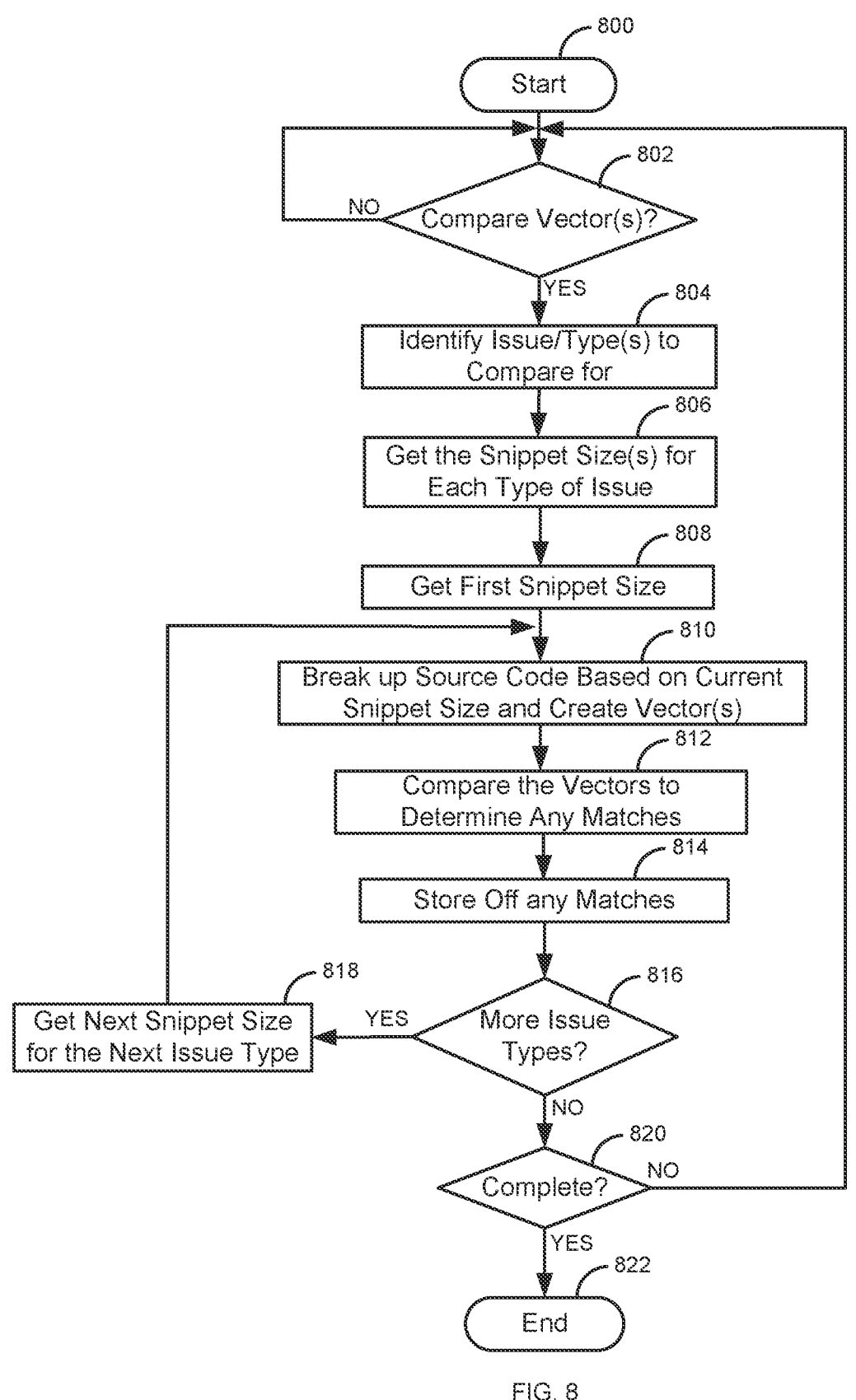
FIG. 8 is a flow diagram of a process for identify mutated issues in source code.

FIG. 8 is a flow diagram of a process for identify mutated issues in the source code 131. The process starts in step 800. The vulnerability scanner 130 determines, in step 802, if vectors are to be compared. If the vectors are not to be compared in step 802, the process of step 802 repeats.

Otherwise, if the vector(s) are to be compared in step 802, the output issue scanner/ML algorithm 124 determines the issue(s)/issue type(s) to compare for in step 804. For example, only vectors of a specific set of vulnerabilities may be identified in step 804. The output issue scanner/ML algorithm 124 gets the snippet sizes for each type of issue(s) that are going to be compared in step 806. The snippet size(s) may be different based on the issue/type. An issue (e.g., a type of mutated issue) may be a mutated type of malware, a mutated type of vulnerability, and a mutated type of non-optimal source code, and/or the like. For example, the snippet size may be an average of a plurality of issues of the same type, a machine learned size of the plurality of issues of the same type, a maximum size of the plurality of issues of the same type, a size for each mutation, and/or the like. The output issue scanner/ML algorithm 124 gets the first snippet size in step 808.

The vector AI algorithm 127 breaks up the source code 131 based on the current snippet size and then creates vectors for each snippet in step 810. For example, if the snippet size for a type of malware is one hundred lines of code, the vector AI algorithm 127 breaks up the source code 131 based using a snippet size of one hundred lines of source code. The lines of source code may not include comments and blank lines. The vector comparer 130 compares, in step 812, the source code 131 by comparing the vectors of snippets 129 in the vector database 128 (those stored off in step 610 that apply to the issue(s)/type(s) determined in step 804) to the vectors of the source code 131 created in step 810 (those that are relevant to the issue(s)/type(s)). Any matches are stored off in step 814. A match may include vector(s) that are close (i.e., the compared snippets are similar) and thus identify snippets that are close.

The vector comparer 130 determines if there are more issue types to compare for in step 816. For example, a second snippet size may have been used to generate the vector(s) for multiple mutations of a specific type of vulnerability. In this example, there would be another issue type to scan for using the new vectors that were generated using the different size of snippet for the specific type of mutated vulnerability. If there are more issue types in step 816, the output issue scanner/ML algorithm 124 gets the next snippet size in step 818 and the process goes back to step 810 to repeat the process for the next snippet size.

If there are no more issue types in step 816, the process goes to step 820. The output issue scanner/ML algorithm 124 determines, in step 820, if the process is complete. If the process is not complete in step 820, the process goes back to step 802. Otherwise, if the process is complete in step 820, the process ends in step 822.

Figure 9:
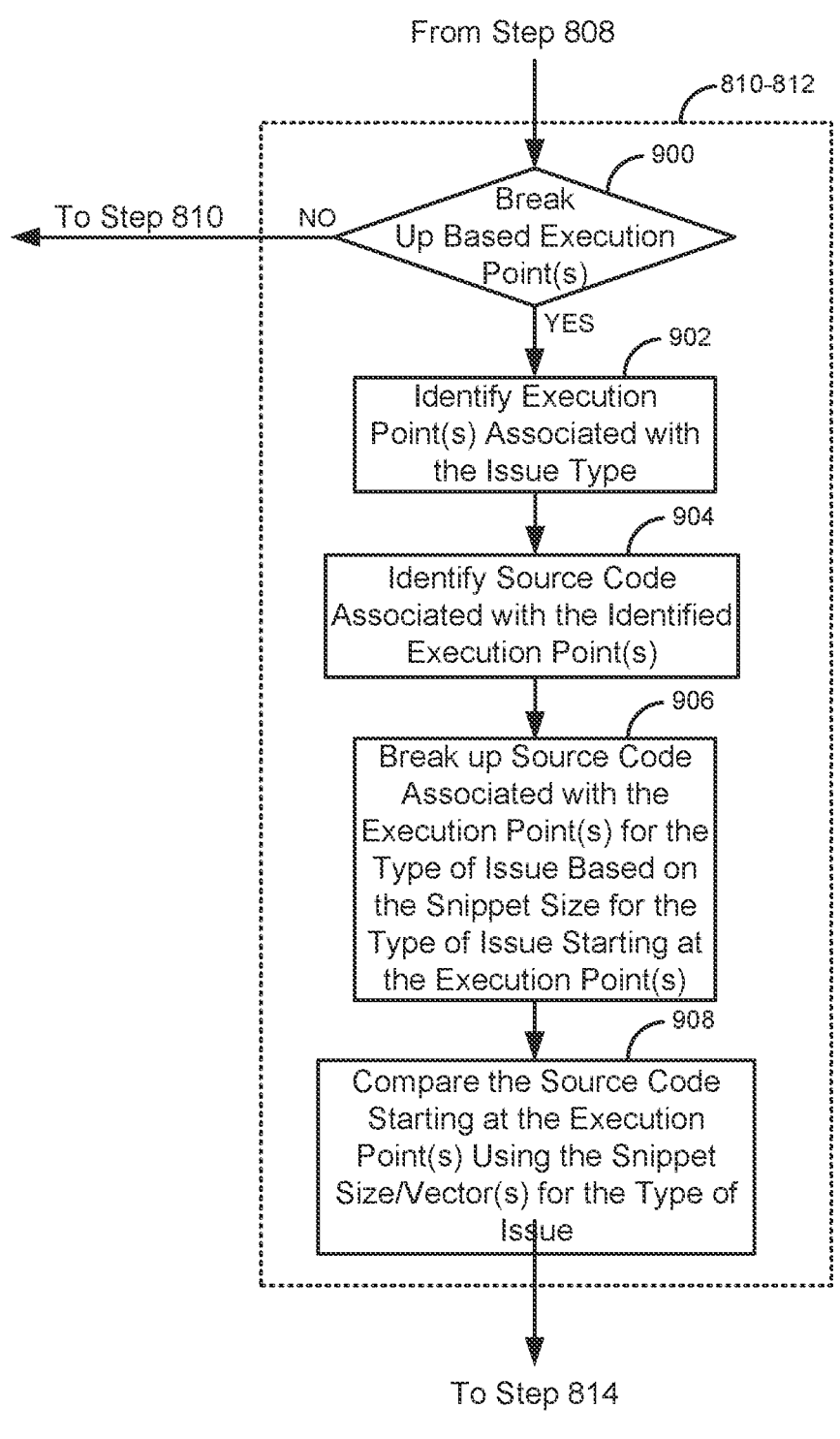
FIG. 9 is a flow diagram of a process for identifying mutated issues based on execution points.

FIG. 9 is a flow diagram of a process for identifying mutated issues based on execution points. FIG. 9 is an exemplary embodiment of steps 810-812 of FIG. 8.

After getting the first snippet size in step 808, the vector AI algorithm 127 determines if breaking up the source code is based on an execution point(s) in the source code 131. When comparing vectors of snippets 129 in the source code 131, the vector comparer 130 can use execution points in the software to begin the breaking up/vector creation from the source code 131. For example, an execution point may be user defined input points, points of execution or forks from the primary process, points of the creation of new threads, points of calling external code, a function calls, input size versus field size, uninitialized variables, application (running as privileged user or not), privilege transitions and/or the like to start searching for snippets of the specific type of issue.

If the source code 131 is not to be broken up based on an execution point(s), in step 900, the process goes to step 810. Otherwise, if the source code 131 is to be broken up based on the execution point(s) in step 900, the vector AI algorithm 127 identifies the execution point(s) associated with the issue type(s) in step 902. Identifying the execution point(s) may also include identify an end execution point(s). The source code that starts at the beginning of the execution point (a beginning execution point) and ends at the end execution point is called an execution point snippet. For example, only a specific function in the source code 131 may be broken into snippets while the rest of the source code 131 is not broken up into snippets. The vector AI algorithm 127 identifies which portions of the source code 131 are associated with the identified execution point(s) in step 904.

The vector AI algorithm 127 breaks up the source code 131 associated with the execution points for the type of issue based on the snippet size for the type of issue beginning at the start of the execution point(s) in step 906. For example, a thread execution point may be a separate function. In this example, the source code for separate thread function would be identified in step 904 and the source code 131 for the separate thread function would be broken up based on the snippet size of the identified snippet of the AI generated source code 123 (e.g., a size of the snippet identified in step 604).

In FIG. 9, there may be multiple portions of the source code 131 that are broken up using different snippet sizes. For example, if there are two types of issues that each have different snippet sizes and have different execution points (e.g., two different functions), the source code 131 for each function may be broken up in step 906 for each function with different size snippets. In other words, the first function (execution point one for issue type one), would be broken up with a first snippet size and the second function (execution point two for a second issue type) would be broken up with a second snippet size.

The source code 131 is compared starting at the execution point(s) using the snippet size/vectors in step 908. The process then goes to step 814 of FIG. 8.

Figure 10:
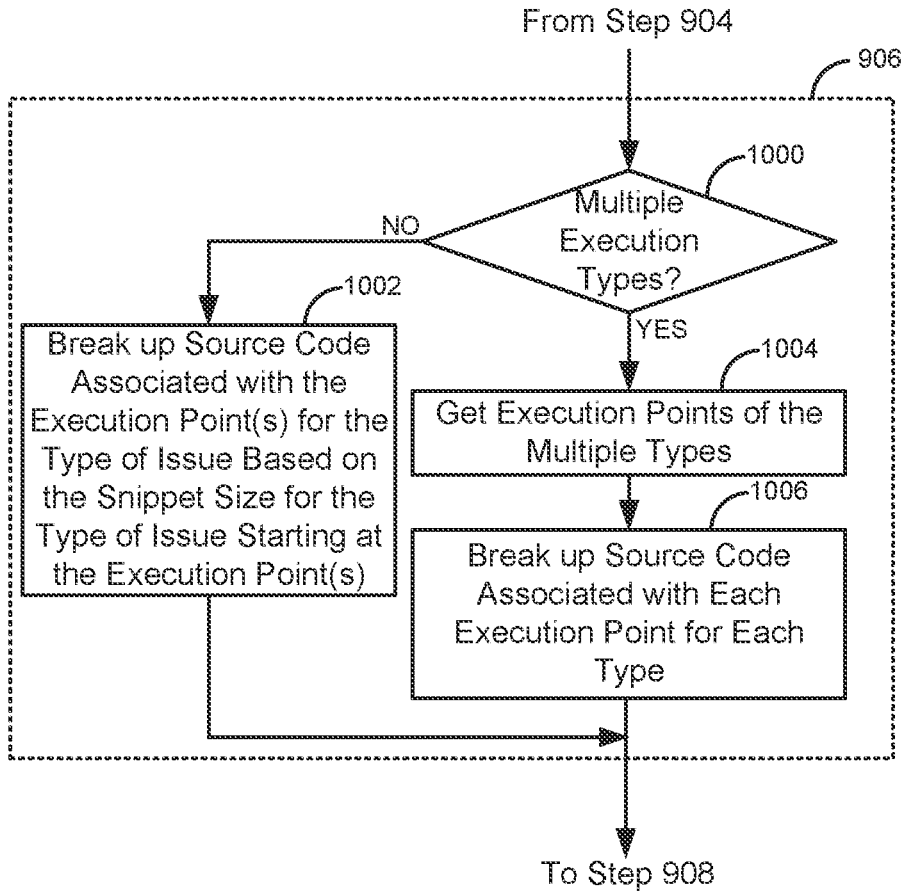
FIG. 10 is a flow diagram of a process for identifying mutated issues based on a type of issue with multiple execution points.

FIG. 10 is a flow diagram of a process for identifying mutated issues based on a type of issue with multiple execution points. FIG. 10 is an exemplary embodiment of step 906 of FIG. 9. After identifying the source code 131 associated with the identified execution point(s) in step 904, the vector AI algorithm 127 determines, in step 1000 if there are multiple execution types (e.g., mutations of an issue). If there are not multiple execution types in step 1000, the source code 131 is broken up based on the snippet size for the execution type in step 1002 and the process goes to step 908.

Otherwise, if there are multiple execution types in step 1000, the vector AI algorithm 127 gets the execution points of the multiple types for the same execution point in step 1004. The vector AI algorithm 127 breaks up the source code associated with each execution point based on the type. For example, if there is a first snippet size associated with the type (e.g., a first type of malware) for an execution point and a second snippet size associated with a second type of malware for the same execution point, the source code 131 will be broken up using the different snippet sizes for the execution point according to the execution type. The process then goes to step 908.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and†or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:

a microprocessor; and a computer readable medium, coupled with the microprocessor and comprising microprocessor readable and executable instructions that, when executed by the microprocessor, cause the microprocessor to:

identify a mutated issue in Artificial Intelligence (AI) generated source code, wherein the AI generated source code is generated by a first AI algorithm;

identify a snippet of source code in the AI generated source code that comprises the mutated issue;

generate a vector based on the snippet of source code in the AI generated source code that comprises the mutated issue; and compare vectors of a second source code to the vector generated from the snippet of source code in the AI generated source code that comprises the mutated issue.

2. The system of claim 1, wherein the vector based on the snippet of source code in the AI generated source code that comprises the mutated issue comprises: a plurality of vectors based on a plurality of snippets of source code in the AI generated source code that comprises a plurality of mutated issues.

3. The system of claim 2, wherein the plurality of vectors based on the plurality of snippets of source code in the AI generated source code that comprises the plurality of mutated issues are generated based on a plurality of different snippet sizes.

4. The system of claim 3, wherein the plurality of different snippet sizes are based on at least one of: an average size of a plurality of issues of a same type, a machine learned size of the plurality of issues of the same type, a single size of a single issue, and a maximum size of the plurality of issues of the same type.

5. The system of claim 3 wherein the second source code is broken up and converted to the plurality of vectors a plurality of times based on each of plurality of different snippet sizes.

6. The system of claim 2, wherein the vectors of the second source code are generated based on an identified execution point snippet of the second source code.

7. The system of claim 6, wherein the identified execution point snippet of the second source code comprises a plurality of identified execution point snippets of the second source code.

8. The system of claim 7, wherein each of the identified plurality of execution point snippets of the second source code are broken up based on a different snippet size.

9. The system of claim 1, wherein the vectors of the second source code are generated from a plurality of snippets of the second source code that only come from an identified execution point snippet of the second source code.

10. The system of claim 9, wherein the identified execution point snippet of the second source code is identified based on at least one of: a defined user input point, a point of execution in the second source code, a point of a fork in execution of the second source code, a point of variance in input size in the second source code, a point of an uninitialized variable in the second source code, a function call in the second source code, and a point of privileged transition in the second source code.

11. The system of claim 1, wherein the mutated issue in the AI generated source code is generated based on an input parameter to the first AI algorithm and wherein the input parameter to the first AI algorithm is a snippet of source code of an issue that is identified while scanning a previous version of the AI generated source code.

12. The system of claim 1, wherein the mutated issue in the AI generated source code is generated based on an input parameter generated by a second AI algorithm and wherein the input parameter generated by the second AI algorithm is generated based on the second AI algorithm identifying an input parameter that is likely to produce new mutations.

13. The system of claim 1, wherein the vector based on the snippet of source code in the AI generated source code that comprises the mutated issue comprises a plurality of vectors based on the snippet of source code in the AI generated source code that comprises of mutated issue and wherein comparing the vectors of the second source code to the vector generated from the snippet of source code in the AI generated source code that comprises the mutated issue is accomplished based on matching a number of the plurality of vectors of the second source code.

14. A method comprising:

identifying, by a microprocessor, a mutated issue in Artificial Intelligence (AI) generated source code, wherein the AI generated source code is generated by a first AI algorithm;

identifying, by the microprocessor, a snippet of source code in the AI generated source code that comprises the mutated issue;

generating, by the microprocessor, a vector based on the snippet of source code in the AI generated source code that comprises the mutated issue; and comparing, by the microprocessor, vectors of a second source code to the vector generated from the snippet of source code in the AI generated source code that comprises the mutated issue.

15. The method of claim 14, wherein the vector based on the snippet of source code in the AI generated source code that comprises the mutated issue comprises: a plurality of vectors based on a plurality of snippets of source code in the AI generated source code that comprises a plurality of mutated issues.

16. The method of claim 15, wherein the plurality of vectors based on the plurality of snippets of source code in the AI generated source code that comprises the plurality of mutated issues are generated based on a plurality of different snippet sizes.

17. The method of claim 16, wherein the plurality of different snippet sizes are based on at least one of: an average size of a plurality of issues of a same type, a machine learned size of the plurality of issues of the same type, a single size of a single issue, and a maximum size of the plurality of issues of the same type.

18. The method of claim 16 wherein the second source code is broken up and converted to the plurality of vectors a plurality of times based on each of plurality of different snippet sizes.

19. The method of claim 15, wherein the vectors of the second source code are generated based on an identified execution point snippet of the second source code.

20. The method of claim 19, wherein the identified execution point snippet of the second source code comprises a plurality of identified execution point snippets of the second source code.

21. The method of claim 20, wherein each of the identified plurality of execution point snippets of the second source code are broken up based on a different snippet size.

22. The method of claim 14, wherein the vectors of the second source code are generated from a plurality of snippets of the second source code that only come from an identified execution point snippet of the second source code.

23. The method of claim 22, wherein the identified execution point snippet of the second source code is identified based on at least one of: a defined user input point, a point of execution in the second source code, a point of a fork in execution of the second source code, a point of variance in input size in the second source code, a point of an uninitialized variable in the second source code, a function call in the second source code, and a point of privileged transition in the second source code.

24. The method of claim 14, wherein the mutated issue in the AI generated source code is generated based on an input parameter to the first AI algorithm and wherein the input parameter to the first AI algorithm is a snippet of source code of an issue that is identified while scanning a previous version of the AI generated source code.

25. The method of claim 14, wherein the mutated issue in the AI generated source code is generated based on an input parameter generated by a second AI algorithm and wherein the input parameter generated by the second AI algorithm is generated based on the second AI algorithm identifying an input parameter that is likely to produce new mutations.

26. The method of claim 14, wherein the vector based on the snippet of source code in the AI generated source code that comprises the mutated issue comprises a plurality of vectors based on the snippet of source code in the AI generated source code that comprises of mutated issue and wherein comparing the vectors of the second source code to the vector generated from the snippet of source code in the AI generated source code that comprises the mutated issue is accomplished based on matching a number of the plurality of vectors of the second source code.

27. A non-transient computer readable medium having stored thereon instructions that cause a processor to execute a method, the method comprising instructions to:

identify a mutated issue in Artificial Intelligence (AI) generated source code, wherein the AI generated source code is generated by a first AI algorithm;

identify a snippet of source code in the AI generated source code that comprises the mutated issue;

generate a vector based on the snippet of source code in the AI generated source code that comprises the mutated issue; and compare vectors of a second source code to the vector generated from the snippet of source code in the AI generated source code that comprises the mutated issue.

* * * * *